April 22, 1969

K. WAGNER 3,439,597

FLASH UNIT FOR CAMERAS

Filed Oct. 24, 1966

INVENTOR.
KARL WAGNER

BY Michael J. Striker
Atty 3,439,597
FLASH UNIT FOR CAMERAS
Karl Wagner, Ottobrunn, Munich, Germany, assignor to Agfa-Gevaert Aktiengesellschaft, Leverkusen, Germany
Filed Oct. 24, 1966, Ser. No. 588,832
Claims priority, application Germany, Oct. 22, 1965, A 50,579
Int. Cl. G03b 9/70
U.S. Cl. 95—11.5                                    10 Claims

ABSTRACT OF THE DISCLOSURE

A photographic camera having a shutter-operating device and a flash bulb arrangement including an electric circuit. An electrically actuated device is used for blocking operation of the shutter-operating device whenever a flash exposure is to be inhibited.

---

The present invention relates to the taking of flash exposures with photographic cameras and, in particular, to an electrical circuit passing through the flash bulb used for taking the exposure.

Heretofore, defective flash exposures were possible if the photographer forgot to replace a used flash bulb, within the camera, with a new one. This problem has also prevailed especially when a plurality of flash bulbs are mounted within a turret, and, although the turret is rotated to apply a new flash bulb before taking an exposure, an old flash bulb is, in fact, inserted in place. Accordingly, the photographer had to be always on his guard to examine the flash bulb prior to usage.

It is therefore an object of the present invention to provide an arrangement for taking flash exposures, with photographic cameras, whereby the release of the camera is inhibited when a used or non-operative flash bulb is to be used for the exposure.

Another object of the present invention is to provide an arrangement for inhibiting the release of photographic cameras, when taking flash exposures and the flash bulb to be used has been newly inserted but is defective and not in proper operating condition.

A further object of the present invention is to provide an arrangement for taking flash exposures with photographic cameras, of the character described, whereby the camera is in the operative state when no flash bulb has been inserted in place and daytime exposures are to be taken.

A yet further object of the present invention is to provide an arrangement, as described, operating on the basis of an electrical control circuit whereby the release rod of the camera is blocked whenever a flash exposure is to be inhibited.

A still further object of the present invention is to provide an arrangement associated with flash exposures in photographic cameras, as set forth, which is simply constructed, compact, and reliable in operation.

With the preceding objects in view, the present invention includes an electrical circuit which actuates a solenoid whenever the release of the camera is to be inhibited. The armature of the solenoid, when actuated, moves within the path of the release rod and prevents the latter from executing the motion whereby the shutter is released. The electromagnetic coil of the solenoid is energized by a transistor circuit passing through a switch which is closed when a flash bulb is inserted in place in the camera. The circuit is also designed to pass through the electrical conducting path of the flash bulb. Whenever a flash bulb has been inserted in place but the electrical path through the flashing element of the bulb is open, the solenoid becomes energized and, as a result, the release rod is blocked. The electrical circuit is energized by the voltage supply used to ignite the flash bulb.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

Figure 1:
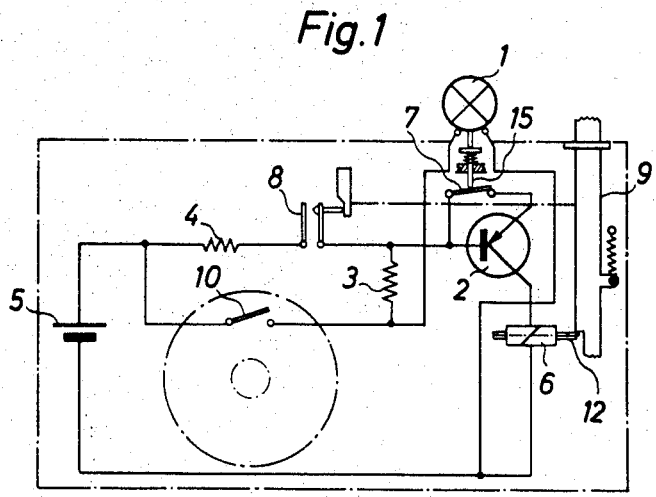
FIG. 1 is a functional electrical schematic diagram showing the connections and interrelationships of the operating elements of the invention.
Figure 2:
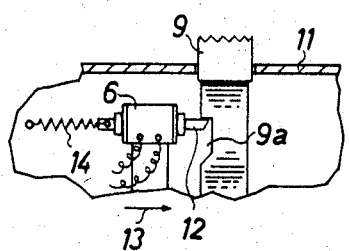
FIG. 2 is a fragmentary functional elevational view showing the blocking arrangement for the camera shutter.

Referring to the drawing and, in particular, to FIG. 1, the flash circuit includes a flash bulb 1, a transistor 2, resistor 3 and 4, and a battery 5, an electromagnet 6 and a switch 7. The switch 7 is closed when the flash bulb 1 is inserted into the camera. Thus, when the socket of the flash bulb 1 is located in place, the actuating mechanism 15 is operated by the socket so as to move the switch 7 into its closed position. The switch 8 is closed by being actuated by the release rod 9, of the camera, during the initial phase of the motion thereof. The synchronizing switch 10 is arranged on the shutter of the camera 11, and is normally actuated when the shutter performs its executing motion.

The electromagnet 6 forms a solenoid in conjunction with the armature 12. When the coil of the electromagnet 6 is energized, the armature rod 12 is actuated in the direction indicated by the arrow 13. The armature rod 12 is thus moved into the recess 9a of the release rod 9, and thereby blocks the latter from undergoing any further motion. When the coil of the electromagnet 6 is not energized, the armature rod 12 is retained outside of the recess 9a, due to the action of the spring 14. Accordingly, when the electromagnet 6 is not in the energized state, a path of the release rod 9 is unobstructed, and the camera can, therefore, be fully released.

The circuit is arranged so that the emitter-collector path of the transistor 2 includes the electromagnet 6, and the switch 7 is closed when the flash bulb 1 is inserted in place. The base of the transistor 2 leads to the negative terminal of the battery 5, by way of the resistor 3 and the circuit of the flash bulb 1. The base of the transistor 2 also leads to the positive terminal of the battery 5, by way of the release rod actuated switch 8 and the resistor 4. The resistor 3 is of the value whereby the current flowing through it, is insufficient to ignite the flash bulb 1.

When the flash bulb 1, or the flash apparatus associated therewith, is not inserted in place in the camera 11, the switch 7 is retained in its open position through the action of the mechanism 15. Once the switch 7 is in its open state, the emitter-collector path of transistor 2 is interrupted and the electromagnet 6 cannot become energized, even though the switches 8 or 10 are closed. Under these circumstances, therefore, the armature rod 12 remains outside of the path of motion of the release rod 9. Accordingly, the release rod 9 may be freely used for daylight exposure when the switch 7 is in its open state.

When, however, a flash bulb or apparatus associated therewith is inserted into the camera for purposes of taking flash exposures, the switch 7 becomes closed as described supra. If the flash bulb is not defective and in proper operating condition, the elecrical circuit through the bulb of flash element is also closed. When the release rod 9 is actuated, the switch 8, mechanically linked to the release rod, becomes closed during the initial phase of motion thereof. At this point, however, the electromagnet 6 remains unenergized. The release rod 9 of the camera is, therefore, not blocked by the solenoid armature 12 and, accordingly, it may continue along its path of motion. As the release rod is thus further actuated, the synchronizing switch 10 becomes closed as a result of the shutter action. With the closure of the switch 10, the flash bulb 1 becomes ignited.

If, now, one forgets to replace the used flash bulb with a new one before taking the next exposure, the switch 7 remains closed, but the electrical circuit through the flash bulb is interrupted. The same situation prevails when the flash bulbs are held by a turret and one forgets to actuate the turret to replace the used flash bulb with a new one, or the turret is actuated but the new bulb inserted in place is either defective or a formerly used bulb. Under these conditions the actuation of the release rod 9 causes, during the initial phase of is motion, the closing of switch 8. As a result of this circuit condition, however, the electromagnet 6 becomes now energized and accordingly, the armature rod 12 enters the recess 9a and causes, thereby, the release rod 9 to become blocked. The latter is, therefore, prevented from moving further and releasing the shutter. The camera can, consequently, be released only provided that a new and properly operating flash bulb is inserted in place, or the used or defective flash bulb is removed entirely, from its place in the camera, so that the switch 7 becomes opened.

In accordance with the present invention, therefore, it is not possible to release the camera and produce a defective exposure when a nonfunctioning or used flash bulb is mounted within the camera. The camera is operative only provided a properly functioning flash bulb is in place, or the flash bulb has been entirely removed from the camera.

It will be understood that each of the elements described above, or two or more together, may also find a useful application of other types of flash arrangements differing from the types described above.

While the invention has been illustrated and described as embodied in photographic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired by Letters Patent is:

1. In a photographic camera, in combination, shutter operating means; a flash bulb arrangement including an electrical circuit having electrical terminals adapted to be bridged by a flash bulb; connecting means for connecting said flash bulb arrangement to said shutter operating means for operating said flash bulb arrangement when said shutter operating means is actuated; blocking means for blocking operation of said shutter operating means when said blocking means are actuated; and actuating means connected to said electric circuit and actuating said blocking means when said terminals are not bridged by an operable flash bulb while said flash bulb arrangement is connected to said shutter operating means by said connecting means.

2. A photographic camera as defined in claim 1 wherein said blocking means is a solenoid having an armature movable against said shutter operating means.

3. A photographic camera as defined in claim 1 including a first switching means actuated by said flash bulb arangement when a flash bulb has been inserted in place when taking a flash exposure.

4. A photographic camera as defined in claim 3 including a second switching means actuated by said shutter operating means prior to igniting said flash bulb, said blocking means being actuated when said first and second switching means are actuated and said flash bulb is nonoperable.

5. A photographic camera as defined in claim 2 including a transistor connected to said solenoid for operating the same.

6. A photographic camera as defined in claim 5 wherein said actuating means includes a power supply for activating said transistor and igniting said flash bulb.

7. A photographic camera as defined in claim 6 including a resistor connected in series with said switching means, said series combination being connected to the base of said transistor.

8. A photographic camera as defined in claim 7 wherein said solenoid is connected in series with the emitter collector path of said transistor.

9. A photographic camera as defined in claim 1 including switching means operated by said shutter operating means to ignite said flash bulb.

10. A photographic camera as defined in claim 2 wherein said shutter operating means has a recess into which said armature of said solenoid enters for blocking said shutter operating means and therefore prevent taking of a flash exposure.

References Cited

UNITED STATES PATENTS

| | | | |
|---|---|---|---|
| 3,374,720 | 3/1968 | Harvey | 95—11.5 |
| 3,383,995 | 5/1968 | Bresson | 95—11.5 |
| 3,391,621 | 7/1968 | Nerwin | 95—11 |
| 3,392,644 | 7/1968 | Beach | 95—11 |

NORTON ANSHER, *Primary Examiner.*

CHARLES E. SMITH, *Assistant Examiner.*

U.S. Cl. X.R.

240—1.3